Oct. 13, 1970     G. F. STROHMAIER     3,533,178
HOLDER FOR VEHICLE REGISTRATION CERTIFICATE
Filed June 3, 1968
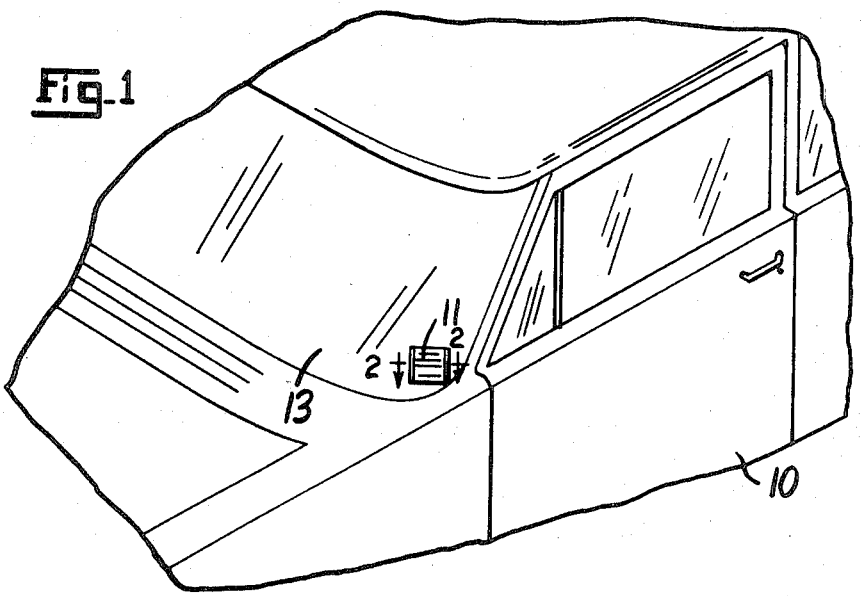
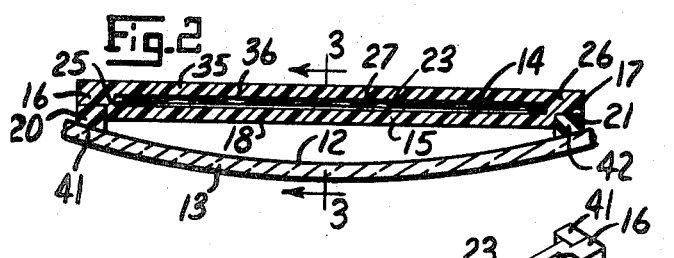
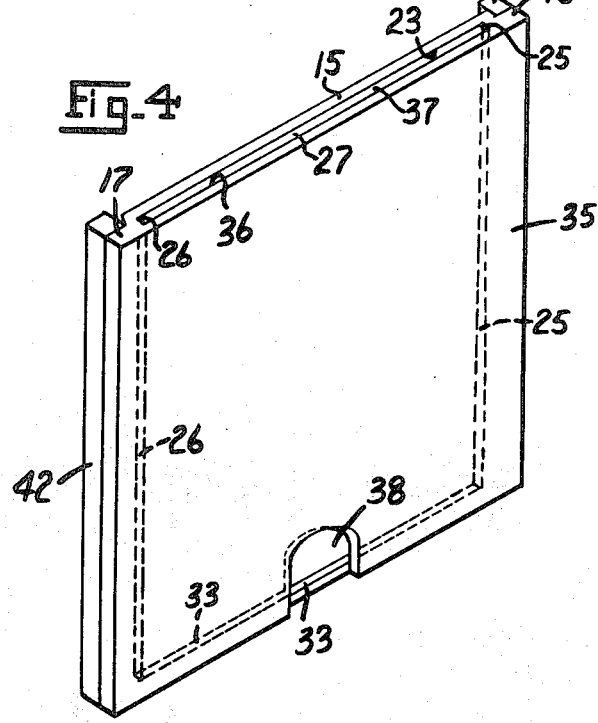
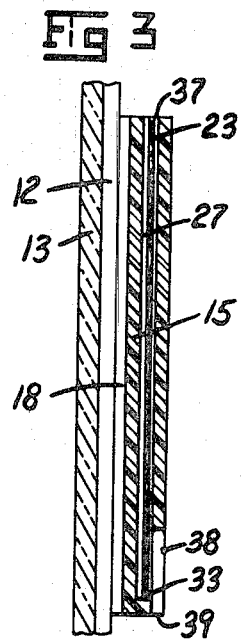
INVENTOR.
GARY F. STROHMAIER
BY
Wells & St. John
Attys.

united States Patent Office 3,533,178
Patented Oct. 13, 1970

3,533,178
HOLDER FOR VEHICLE REGISTRATION CERTIFICATE
Gary F. Strohmaier, Rte. 1, Box 136,
Touchet, Wash. 99360
Filed June 3, 1968, Ser. No. 733,890
Int. Cl. G09f 3/18
U.S. Cl. 40—10                                1 Claim

ABSTRACT OF THE DISCLOSURE

The disclosure describes a vehicle registration certificate holder for affixing to an inside surface of a vehicle for visual display to the outside. The holder has a transparent front wall and a transparent back wall that are spaced apart to form a rectangular back cavity therebetween for receiving the certificate. The cavity extends to a top surface to provide an opening for inserting the certificate into the holder. Resilient pads are secured to the offset front surfaces of the front wall. Pressure sensitive adhesive is placed on the pads to enable the holder to be pressed against the window surface to affix the holder thereto.

BACKGROUND OF THE INVENTION

This invention relates to holders for conveniently displaying vehicle registration certificates.

Vehicle registration status of several states require that vehicle registration certificates or identification cards be displayed within the vehicle so that they can be easily seen from outside the vehicle.

One of the principal objects of this invention is to provide a new and inexpensive holder that protects the registration certificate from becoming soiled or torn and which is capable of being affixed to any convenient visible surface within the vehicle.

An additional object of this invention is to provide a holder that has rigid wall structures for protecting the registration certificate and with means for conveniently removing the certificate when desired.

A further object of this invention is to provide a holder that has inexpensive yet versatile and effective means for mounting or affixing the holder to various contoured surfaces.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a fragmentary perspective view of a vehicle showing a vehicle registration certificate holder mounted to the side of a curved window surface of the vehicle;

FIG. 2 is a cross sectional view taken along line 2—2 in FIG. 1 showing the holder in horizontal cross section;

FIG. 3 is a cross sectional view taken along line 3—3 showing the holder in vertical cross section; and FIG. 4 is an enlarged perspective view of the holder.

DESCRIPTION OF THE PREFERED EMBODIMENT

Referring now in detail to the drawings, there is illustrated in FIG. 1 a vehicle 10 such as an automobile with a vehicle registration certificate holder 11 mounted to an inside surface 12, such as a window section 13. In FIG. 1 the holder 11 is mounted on the inside of a corner section of a windshield. The holder may also be mounted on top of a dash board. The holder 11 is designed to receive and display a vehicle registration certificate or identification card 14.

The holder 11 may be a one piece or two piece body unit having a transparent front wall 15 that is made of transparent material such as glass or plastic. The sides 16 and 17 of the front wall 15 are reduced in thickness to form indented front surfaces 20 and 21 that are set back from the central front surface 18 of the front wall 15. The front wall 15 has a flat back surface 27.

The holder 11 has a back wall 35 that may be either opaque or transparent. Preferably the back wall should be transparent and molded integrally with the front wall so that the vehicle operator may easily read any information that is recorded on the back of the vehicle registration certificate. The back wall 35 has approximately the same height and width as the front wall 15. The back wall 35 has a flat front surface 36. The back wall is spaced from the front wall 15 to form a rectangular cavity 23 therebetween for receiving the registration certificate 14 through a thin rectangular top opening 37 for facilitating the insertion and removal of the registration certificate in the cavity. The cavity has side surfaces 25 and 26 and a bottom surface 33 which form a rectangular cavity that is slightly larger than the certificate 14.

A slot 38 is formed through the back plate 35 and extends upwardly from a bottom edge 39 toward the central portion of the back plate 35.

The slot 38 is provided to assist in the removal of the vehicle registration certificate from the rectangular cavity 23 when desired. To remove the certificate a finger is inserted through the slot 38 to engage the bottom portion of the vehicle registration certificate and to move the certificate up slightly so that the upper edge of the certificate sticks out the opening 37 so that the certificate may be conveniently grasped and removed from the holder.

Two resilient elongated pads 41 and 42 preferably made of a synthetic rubber material or the like are secured to the indented front surfaces 20 and 21 respectively of the first plate 15. The thickness of the resilient pads is such that it extends forward of the central front surface 18 to support the holder spaced from the inside surface 12 of the window section 13. The resiliency of the pads enables the holder to be affixed to the contour of the many different surfaces. To secure the holder to a surface section a pressure sensitive adhesive is applied to the front surfaces of the resilient pads 41 and 42 so that the vehicle owner only has to press the holder against the inside surface of the window section to affix the holder thereto.

It should be appreciated that the above described embodiment is simply illustrative of the principles of this invention and modifications may be made without deviating from the principles thereof. Therefore, only the following claim is intended to define this invention.

What I claim is:

1. A holder for attaching to a surface of a vehicle to display a vehicle registration certificate or the like, said holder comprising:
   (a) a body unit having a transparent front wall and a transparent back wall that are spaced to form a thin rectangular cavity therebetween that is slightly larger than the registration certificate and extends to a top surface to form a top opening;
   (b) said front wall having recessed front surfaces adjacent side edges;
   (c) said back wall having a central slot formed therethrough communicating with the rectangular cavity that extends from a bottom edge upwardly towards the center of the back wall for facilitating the removal of the certificate from the rectangular cavity;

(d) elongated resilient pads secured to the recessed front surfaces; and
(e) pressure sensitive adhesive applied to the pads to secure the holder to a surface of the vehicle.

References Cited

UNITED STATES PATENTS

| | | |
|---|---|---|
| 2,093,598 | 9/1937 | Clark. |
| 2,957,261 | 10/1960 | Moskowitz. |
| 3,319,369 | 5/1967 | Severson _____ 40—10 |

FOREIGN PATENTS 254,143   7/1926   Great Britain.

EUGENE R. CAPOZIO, Primary Examiner

W. J. CONTRERAS, Assistant Examiner

U.S. Cl. X.R.

40—129